United States Patent

Chow

[11] Patent Number: 5,842,866
[45] Date of Patent: Dec. 1, 1998

[54] COLOR CHART

[76] Inventor: Dong Lein Chow, No. 1, Lane 1130, Sec. 1, Chang Nan Road, Nan Tou City, Nan Tou Hsien, Taiwan

[21] Appl. No.: 890,635

[22] Filed: Jul. 14, 1997

[51] Int. Cl.[6] .................................................. G09B 19/08
[52] U.S. Cl. .............................................................. 434/98
[58] Field of Search .................................. 434/98, 81

[56] References Cited

U.S. PATENT DOCUMENTS

| 1,125,078 | 1/1915 | Dunn | 434/98 X |
| 2,866,277 | 12/1958 | Wise | 434/98 |

FOREIGN PATENT DOCUMENTS

| 1233741 | 10/1960 | France | 434/98 |
| 162838 | 9/1905 | Germany | 434/98 |

Primary Examiner—Jeffrey A. Smith

[57] ABSTRACT

A color chart includes three or more concentric circles having three, six, twelve or more color areas. The second circle includes three areas aligned with and designated by that of the first circle and further includes three areas located between and formed by the three colors of the first circle. The third circle includes six areas of the second circle and further includes six areas located between and formed by the six areas of the second circle. A center includes a black triangle and a white triangle each having three angles directed to three basic colors respectively.

4 Claims, 1 Drawing Sheet

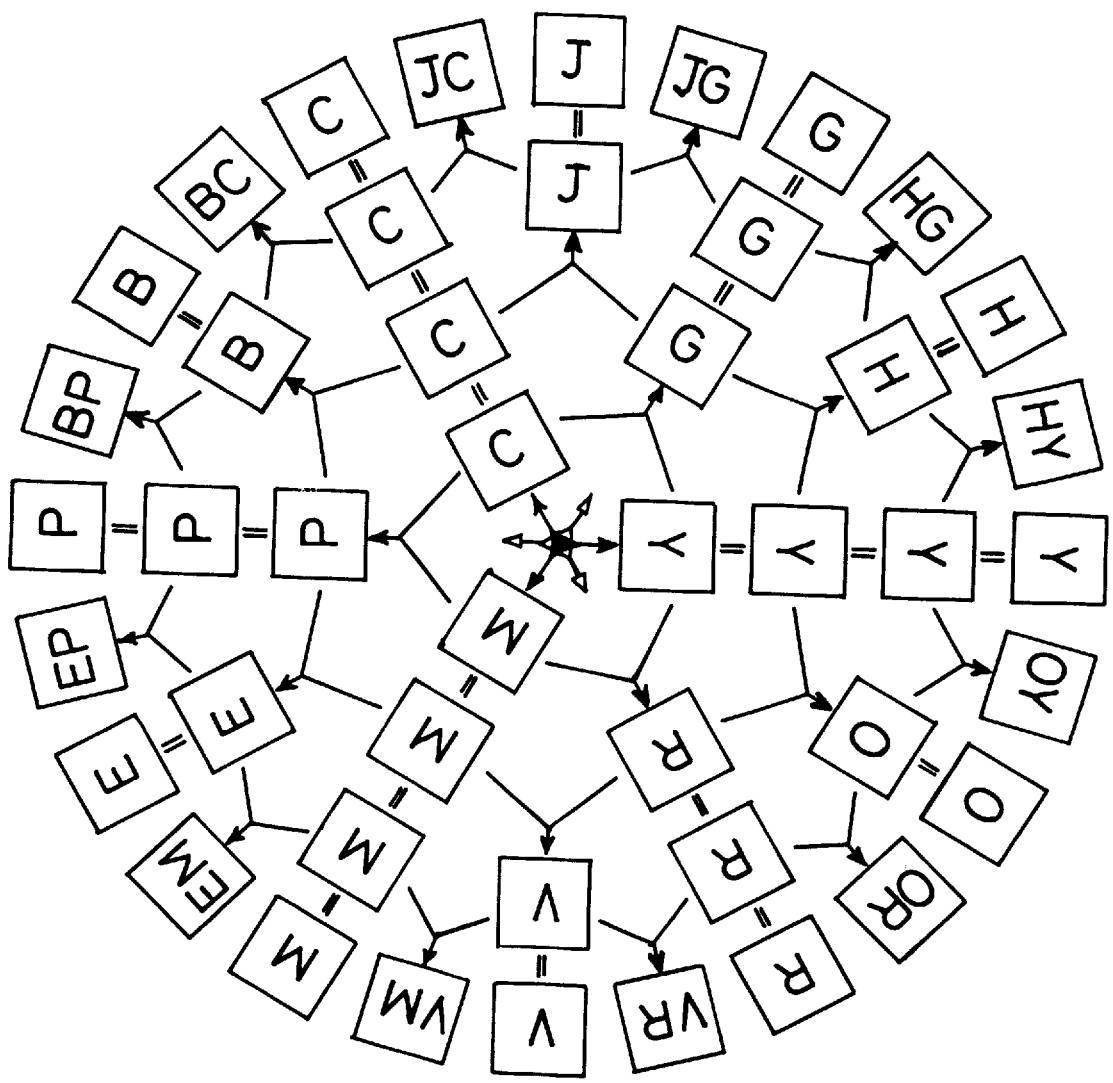
F I G. 1 ately and quickly develop and obtain the result colors from the basic colors.

COLOR CHART

BACKGROUND OF THE INVENTION

1. Field of the Invention

The present invention relates to a chart, and more particularly to a color chart.

2. Description of the Prior Art

Typical color charts are provided for allowing the user to know how to obtain the colors by three or four basic colors which includes yellow, red, blue and/or green. However, the user may not easily and quickly develop and obtain the result colors from the basic colors.

The present invention has arisen to mitigate and/or obviate the afore-described disadvantages of the conventional color charts.

SUMMARY OF THE INVENTION

The primary objective of the present invention is to provide a color chart for allowing the user to develop and to obtain the result colors from the three basic colors.

In accordance with one aspect of the invention, there is provided a color chart comprising at least three concentric circles including a first circle, a second circle, and a third circle having a radius increased from that of the first circle to that of the third circle. The first circle includes three areas designated by yellow (Y), magenta (M) and cyan (C) respectively. The second circle includes six areas, and the third circle includes twelve areas, the second circle and the third circle each includes three areas aligned with and designated by yellow (Y), magenta (M), and cyan (C), the second circle further includes an area located between and formed by yellow (Y) and magenta (M) and designated by red (R), an area purple (P) located between and formed by magenta (M) and cyan (C), and an area green (G) located between and formed by cyan (C) and yellow (Y). The third circle includes three areas aligned with and designated by red (R), purple (P) and green (G) respectively for allowing the third circle to have six areas designated by six colors determined in the second circle. The third circle further includes an area orange (O) located between and formed by yellow (Y) and red (R), an area vermilion (V) located between and formed by red (R) and magenta (M), an area eggplant (E) located between and formed by magenta (M) and purple (P), an area blue (B) located between and formed by purple (P) and cyan (C), an area jade (J) located between and formed by cyan (C) and green (G), and an area herbaceous (H) located between and formed by green (G) and yellow (Y).

A fourth circle includes a radius greater than that of the third circle and includes twelve areas aligned with and designated by the twelve colors of the third circle, the twelve colors include yellow (Y), orange (O), red (R), vermilion (V), magenta (M), eggplant (E), purple (P), blue (B), cyan (C), jade (J), green (G), and herbaceous (H) respectively. The fourth circle further includes an area orange yellow (OY) located between and formed by yellow (Y) and orange (O), an area orange red (OR) located between and formed by orange (O) and red (R), an area vermilion red (VR) located between and formed by red (R) and vermilion (V), an area vermilion magenta (VM) located between and formed by vermilion (V) and magenta (M), an area eggplant magenta (EM) located between and formed by magenta (M) and eggplant (E), an area eggplant purple (EP) located between and formed by eggplant (E) and purple (P), an area blue purple (BP) located between and formed by purple (P) and blue (B), an area blue cyan (BC) located between and formed by blue (B) and cyan (C), an area jade cyan (JC) located between and formed by cyan (C) and jade (J), an area jade green (JG) located between and formed by jade (J) and green (G), an area herbaceous green (HG) located between and formed by green (G) and herbaceous (H), and an area herbaceous yellow (HY) located between and formed by herbaceous (H) and yellow (Y).

The concentric circles include a center which includes a black triangle having three angles directed to yellow (Y), magenta (M) and cyan (C) respectively, for indicating that a black color is formed when yellow (Y), magenta (M) and cyan (C) are mixed together. The center includes a white triangle having three angles directed to red (R), purple (P) and green (G) respectively, for indicating that a light color is formed when red (R) color light, purple (P) color light and green (G) color light are mixed together.

Further objectives and advantages of the present invention will become apparent from a careful reading of a detailed description provided hereinbelow, with appropriate reference to accompanying drawings.

BRIEF DESCRIPTION OF THE DRAWINGS

FIG. 1 is a schematic view of a color chart in accordance with the present invention.

DETAILED DESCRIPTION OF THE PREFERRED EMBODIMENT

Referring to FIG. 1, a color chart in accordance with the present invention comprises four concentric circles including a first circle, a second circle, a third circle and a fourth circle having a radius gradually increased from the radially innermost circle to the radially outermost circle. The first circle includes three areas each represented by a square. Alternatively, the areas may be represented by circles or by any other shapes. The three areas are designated by or colored with three basic colors, i.e., yellow (Y), magenta (M) and cyan (C) respectively. The second circle includes six areas, the third circle includes twelve areas, and the fourth circle includes twenty four areas. The second circle and the third circle and the fourth circle each includes three areas aligned with and designated by the three basic colors yellow (Y), magenta (M), and cyan (C).

The second circle includes an area located between the colors yellow (Y) and magenta (M) and designated by red (R). This means that red (R) is formed and mixed by yellow (Y) and magenta (M). It is preferable that the red (R) color is mixed by 50% of yellow (Y) and 50% of magenta (M). Similarly, an area purple (P) is located between and formed by magenta (M) and cyan (C); and an area green (G) is located between and formed by cyan (C) and yellow (Y). The third circle and the fourth circle each includes three areas aligned with and designated by the three developed colors red (R), purple (P) and green (G) respectively. The third and the fourth circles thus each includes six areas that have been determined and designated by the six colors determined in the second circle.

Similarly, the third circle includes an area orange (O) located between and formed by yellow (Y) and red (R); an area vermilion (V) located between and formed by red (R) and magenta (N); an area eggplant (E) located between and formed by magenta (M) and purple (P); an area blue (B) located between and formed by purple (P) and cyan (C); an area jade (J) located between and formed by cyan (C) and green (G); and an area herbaceous (H) located between and formed by green (G) and yellow (Y). The fourth circle includes six areas aligned with and designated by the six developed colors orange (O), vermilion (V), eggplant (E), blue (B), jade (J) and herbaceous (H) respectively. The fourth circle thus includes twelve areas that have been determined and designated by the twelve colors determined in the third circle.

Similarly, the fourth circle includes an area orange yellow (OY) located between and formed by yellow (Y) and orange (O); an area orange red (OR) located between and formed by orange (O) and red (R); an area vermilion red (VR) located between and formed by red (R) and vermilion (V); an area vermilion magenta (VM) located between and formed by vermilion (V) and magenta (M); an area eggplant magenta (EM) located between and formed by magenta (M) and eggplant (E); an area eggplant purple (EP) located between and formed by eggplant (E) and purple (P); an area blue purple (BP) located between and formed by purple (P) and blue (B); an area blue cyan (BC) located between and formed by blue (B) and cyan (C); an area jade cyan (JC) located between and formed by cyan (C) and jade (J); an area jade green (JG) located between and formed by jade (J) and green (G); an area herbaceous green (HG) located between and formed by green (G) and herbaceous (H); and an area herbaceous yellow (HY) located between and formed by herbaceous (H) and yellow (Y). The fourth circle thus includes twenty four areas designated by twenty four colors respectively.

Similarly, a fifth circle, a sixth circle, a seventh circle . . . may also be easily formed by similar way and may each include forty eight colors, ninety six colors, one hundred ninety two colors . . . etc. The fifth circle includes twenty four colors identical to and aligned with that of the fourth circle. The sixth circle includes forty eight colors identical to and aligned with that of the fifth circle. The user may thus easily use the color chart to develop the required colors.

As shown in the center of the circles, a black triangle includes three angles directed to yellow (Y), magenta (M) and cyan (C) respectively. This means that the three basic colors may form black color when the three basic colors are mixed together with equal quantity. A white triangle includes three angles directed to red (R), purple (P) and green (G) respectively. The three colors red (R), purple (P) and green (G) are the basic colors of light; i.e., a white color or the light color may be formed when the three basic color lights are mixed together.

Accordingly, the color chart in accordance with the present invention may be used for allowing the user to develop and to obtain the result colors easily and quickly from the three basic colors.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A color chart comprising:

at least three concentric circles including a first circle, a second circle, and a third circle having a radius increased from that of said first circle to that of said third circle, said first circle consisting of three areas designated by yellow (Y), magenta (M) and cyan (C) respectively, said second circle consisting of six areas, and said third circle consisting of twelve areas, said second circle and said third circle each including three areas aligned with and designated by yellow (Y), magenta (M), and cyan (C), said second circle further including an area located between and formed by yellow (Y) and magenta (M) and designated by red (R), an area purple (P) located between and formed by magenta (M) and cyan (C), and an area green (G) located between and formed by cyan (C) and yellow (Y), said third circle including three areas aligned with and designated by red (R), purple (P) and green (G) respectively for allowing said third circle to have six areas designated by six colors determined in said second circle, said third circle further including an area orange (O) located between and formed by yellow (Y) and red (R), an area vermilion (V) located between and formed by red (R) and magenta (M), an area eggplant (E) located between and formed by magenta (M) and purple (P), an area blue (B) located between and formed by purple (P) and cyan (C), an area jade (J) located between and formed by cyan (C) and green (G), and an area herbaceous (H) located between and formed by green (G) and yellow (Y).

2. A color chart according to claim 1 further comprising a fourth circle including a radius greater than that of said third circle, said fourth circle consisting of twenty-four areas, said fourth circle including twelve areas aligned with and designated by the twelve colors of said third circle, the twelve colors including yellow (Y), orange (O), red (R), vermilion (V), magenta (M), eggplant (E), purple (P), blue (B), cyan (C), jade (J), green (G), and herbaceous (H) respectively, said fourth circle further including an area orange yellow (OY) located between and formed by yellow (Y) and orange (O), an area orange red (OR) located between and formed by orange (O) and red (R), an area vermilion red (VR) located between and formed by red (R) and vermilion (V), an area vermilion magenta (VM) located between and formed by vermilion (V) and magenta (M), an area eggplant magenta (EM) located between and formed by magenta (M) and eggplant (E), an area eggplant purple (EP) located between and formed by eggplant (E) and purple (P), an area blue purple (BP) located between and formed by purple (P) and blue (B), an area blue cyan (BC) located between and formed by blue (B) and cyan (C), an area jade cyan (JC) located between and formed by cyan (C) and jade (J), an area jade green (JG) located between and formed by jade (J) and green (G), an area herbaceous green (HG) located between and formed by green (G) and herbaceous (H), and an area herbaceous yellow (HY) located between and formed by herbaceous (H) and yellow (Y).

3. A color chart according to claim 1, wherein said at least three concentric circles include a center, said center includes a black triangle having three angles directed to yellow (Y), magenta (M) and cyan (C) respectively, for indicating that a black color is formed when yellow (Y), magenta (M) and cyan (C) are mixed together.

4. A color chart according to claim 1, wherein said at least three concentric circles include a center, said center includes a white triangle having three angles directed to red (R), purple (P) and green (G) respectively, for indicating that a light color is formed when red (R) color light, purple (P) color light and green (G) color light are mixed together.

* * * * *